United States Patent
Ness et al.

(10) Patent No.: US 6,855,681 B1
(45) Date of Patent: Feb. 15, 2005

(54) DETERGENT COMPOSITION

(75) Inventors: Jeremy Nicholas Ness, Kent (GB); Marcus James Goodall, Kent (GB)

(73) Assignee: Quest International B.V., Naarden (NL)

( * ) Notice: Subject to any disclaimer, the term of this patent is extended or adjusted under 35 U.S.C. 154(b) by 0 days.

(21) Appl. No.: 09/889,105

(22) PCT Filed: Jan. 28, 2000

(86) PCT No.: PCT/GB00/00235

§ 371 (c)(1),
(2), (4) Date: Nov. 13, 2001

(87) PCT Pub. No.: WO00/46337

PCT Pub. Date: Aug. 10, 2000

(30) Foreign Application Priority Data

Feb. 2, 1999 (GB) ............................................. 9902225
Mar. 16, 1999 (GB) ............................................. 9905868

(51) Int. Cl.$^7$ ............................. C11D 3/22; C11D 3/50; C11D 17/08
(52) U.S. Cl. ....................... 510/349; 510/276; 510/101; 510/417; 510/441; 510/470; 510/473; 510/474; 510/523
(58) Field of Search ................................ 510/276, 349, 510/417, 441, 470, 473, 474, 523, 101

(56) References Cited

U.S. PATENT DOCUMENTS

| | | | |
|---|---|---|---|
| 3,888,689 A | 6/1975 | Maekawa et al. ............. 106/24 |
| 4,389,419 A | 6/1983 | Lim et al. ...................... 426/72 |
| 4,961,871 A | * 10/1990 | Michael .................. 252/174.11 |
| 5,281,355 A | 1/1994 | Tsaur et al. .................. 252/174 |
| 5,716,920 A | 2/1998 | Glenn, Jr. et al. ........... 510/159 |

FOREIGN PATENT DOCUMENTS

| | | | |
|---|---|---|---|
| EP | 0 202 819 | 11/1986 | .......... A61K/47/00 |
| EP | 0 266 796 B1 | 5/1988 | |
| EP | 0 626 445 A2 | 11/1994 | |
| GB | 1 390 503 | 4/1975 | .......... C11D/11/00 |
| WO | WO 92/20771 | 11/1992 | |
| WO | WO 98/11870 | 3/1998 | |
| WO | WO 99/24159 | 5/1999 | ............ B02J/13/08 |

OTHER PUBLICATIONS

"Merriam–Webster's Collegiate Dictionary", Tenth Edition, Merriam–Webster Inc., 1993, p. 717.*

* cited by examiner

*Primary Examiner*—Brian P. Mruk
(74) *Attorney, Agent, or Firm*—Morgan, Lewis & Bockius LLP

(57) ABSTRACT

A liquid detergent composition contains greater than 5% by weight of surfactant and an encapsulate containing greater than 10% by weight of active material in a hydrated cross-linked anionic gum matrix. The anionic gum is preferably an alginate. The active material is preferably a fragrance. The detergent composition is particularly suitable for use as a laundry liquid.

17 Claims, No Drawings

DETERGENT COMPOSITION

This application is the National Phase of International Application PCT/GB00/00235 filed Jan. 28, 2000 which designated the U.S. and that International Application was published under PCT Article 21(2) in English.

FIELD OF THE INVENTION

This invention concerns detergent compositions, and in particular such compositions comprising an encapsulate containing an active material, and products, particularly laundry liquids, incorporating such compositions.

BACKGROUND TO THE INVENTION

Encapsulation is a well known technique for presenting active materials such as fragrance, flavour, colouring materials etc. Encapsulate systems fall into two main types: those in which the active material is surrounded by a wall or barrier; and those in which the active material is encapsulated in the matrix of a material. Gums, such as alginates, have been used to encapsulate active materials.

Alginates which are anionic gums, are naturally occurring colloids which are normally extracted from brown seaweed (Phaeophycea), which are used mainly in the form of sodium salts. Sodium alginates give very viscous solutions with water and can be cross-linked to form thermally stable gels by interaction with divalent or trivalent metal ions, typically calcium ions. Using this interaction, active materials may be encapsulated or entrapped in an alginate gel matrix. The colloid is principally alginic acid which is made up of three kinds of polymer segments, one segment containing D-mannuronic acid units; a second segment containing L-guluronic acid; and a third segment containing alternating D-mannuronic and L-guluronic acid residues, joined by 1:4 glycosidic linkages. The proportions of the three polymer segments in alginic acid samples give rise to different properties, for example, the alginate from *Laminaria hyperborea*, with a large percentage of polyguluronate segments, forms rigid, brittle gels which tend to undergo syneresis.

There is a large amount of literature in the area of fragrance encapsulation, not only to provide fragrance stability but also to develop a fragrance delivery system which provides a perceivable sensory effect. To this end, numerous systems have been tested but there are currently no detergent compositions, for example laundry liquids, in the market place which utilise an anionic gum based encapsulation system containing fragrance.

U.S. Pat. No. 4,389,419 (Lim) concerns capsules of oil soluble nutrients such as vitamins which are formed by making an emulsion of sodium alginate with the nutrient and with optional alcohol-insoluble polysaccharide filler or extender such as dextran, sodium carboxy methyl cellulose, methyl cellulose, dextrins and some soluble starches and sodium carboxy cellulose, and adding the emulsion as droplets to an alcoholic solution containing calcium chloride to give solid capsules.

EP 0202819A (Warner Lambert) discloses encapsulates formed by mixing alginate with active ingredient, particularly to produce a dispersion, and cross-linking the alginate by exposure to divalent cations, for example by spraying the dispersion into calcium chloride to produce particles eg up to 10 micron in diameter. The encapsulates may be used particularly in chewing gum, but also in confectionery, foods, pharmaceuticals, toothpaste etc.

WO 92/20771 (Allied Colloids Ltd.) discloses a particulate composition comprising particles having a substantially anhydrous core comprising a matrix polymer containing active ingredient, a layer of hydrophobic oil around the core and a shell of polymer around the oil layer. The active ingredient is disclosed as a detergent enzyme.

EP 0626 445 A2 (Allied Colloids Ltd) discloses a liquid composition comprising a substantially stable dispersion in a liquid phase of particles which have a size below 20 $\mu$m and which comprise a detergent enzyme and protective polymeric material which is impermeable to the liquid detergent concentrates but which releases the enzyme when agitated in aqueous wash liquor.

EP 0266 796 B1 (Showa Denko Kabushiki Kaisha) discloses a water-soluble microcapsules, containing enzymes, which are stably retained in a concentrated aqueous solution containing an agent such as a surfactant and are readily dissolved in water or a dilute aqueous solution. The water-soluble microcapsules utilise a coating material, specifically polyvinyl alcohol with an average degree of polymerisation in the range of 200 to 3,000 and a saponification ratio of not less then 90%. The core material is disclosed as a water-containing polyhydroxy compound.

U.S. Pat. No. 5,281,355 (Lever Brothers company) discloses a heavy duty liquid composition comprising (1) a capsule comprising a component or components normally subject to degradation by components of these compositions; and (2) a composite polymer forming a network in which the component(s) are entrapped and from which network the component(s) are released upon dilution of the concentrated liquids. The composite emulsion copolymer in turn comprises a hydrophilic portion i.e., hydrophilic polymer attached to a hydrophobic particles and a hydrophobic polymer core portion wherein the hydrophilic portion comprises hydrophilic water soluble polymer or polymers physically or chemically attached to said hydrophobic polymer particles.

GB-A-1 390 503 (Unilever Limited) relates to a liquid aqueous detergent composition cantaining capsules which are insoluble in the composition, but which release their contents when the composition is diluted with water, due to the change in ionic strength of the liquid environment of the capsules. The patent discloses capsules containing core material and having at their surface water-soluble polymer gel, in which the electrolyte and its concentration in the medium, and the polymer gel are such that the polymer gel is insoluble in the medium, but dissolves with release of the core material when the composition is diluted with water, preferably the polymer gel forms a wall surrounding the core material.

U.S. Pat. No. 5,716,920 and WO 98/11870 (The Procter & Gamble Company) both disclose liquid personal cleansing compositions including a lipophilic skin moisturising agent encapsulated with a complex coacervate of a polycation and a polyanion. The polyanion may be, eg, sodium alginate. The encapsulate must be substantially free of cross-linking agent for the complex coacervate to have appropriate hardness characteristics.

Our copending PCT patent application number GB98/03345 (WO 99/24159) is directed at alginate encapsulates, and in particular the use thereof in toothpaste.

The present invention provides a detergent composition which utilises an anionic gum based encapsulate containing active material, which dissolves on dilution resulting in release of the active material.

SUMMARY OF THE INVENTION

In one aspect the present invention provides a liquid detergent composition comprising greater than 5% by weight of surfactant and an encapsulate comprising greater than 10% by weight of the encapsulate of active material, and a cross-linked anionic gum.

The invention also provides a liquid detergent composition comprising greater than 5% by weight of surfactant and an encapsulate comprising greater than 0.5% by weight of the encapsulate of fragrance, and an anionic gum. The anionic gum is preferably cross-linked.

The invention further provides a laundry liquid comprising greater than 5% by weight of surfactant and an encapsulate comprising active material and an anionic gum. The anionic gum is preferably crosslinked.

The present invention is particularly directed to provide a dilution release encapsulate containing fragrance as the active material, preferably for laundry liquids, which can be incorporated into a laundry liquid base, is stable on storage yet dissolves on diluting the product, releasing the active material. The invention also provides for a visual effect in the product, contributing to its appeal, which can enhance both active intensity and longevity. There is also the opportunity to deliver novel effects e.g. change of fragrance during the wash, or protection of enzymes against degradation.

The active is preferably in the form of an emulsion or disersion in the anionic gum, and may be selected from a wide range of different materials, depending on the intended use of the encapsulate, including, for example, fragrance materials, conditioning oils, abrasives, colouring materials, enzymes such as protease, amylase, cellulase or lipase, therapeutic agents such as anti-bacterial agents, etc. The active material is preferably substantively insoluble in water, and/or preferably sufficiently large (eg preferably having a molecular weight of at least 5000) to be retained by the alginate. Suitable materials are well known. The active material is preferably a fragrance. A mixture of active materials may be used.

The active material may be present in relatively large amounts, typically constituting up to 60% by weight of the total weight of the encapsulate. The active material is typically present in an amount in the range from 10 to 50%, preferably 20 to 40%, and more preferably 25 to 30% by weight of the encapsulate. By the term "% by weight of the encapsulate" is meant relative to the weight of all encapsulate ingredients, including water etc.

The nature of the fragrance is not critical. As is well known, a fragrance normally contains a mixture of a number of perfumery materials. The number of perfumery materials in a fragrance is typically ten or more. The range of fragrant materials used in perfumery is very wide; the materials come from a variety of chemical classes, but in general are water-insoluble oils. In many instances, the molecular weight of a perfumery material is in excess of 150, but does not exceed 300. The fragrance is preferably present at a concentration of greater than 1%, and more preferably greater than 5% by weight of the encapsulate.

The fragrances used in the present invention can be mixtures of conventional perfumery materials. Perfumery materials which may be used include: acetyl cedrene, 4-acetoxy-3-pentyltetrahydropyran, 4-acetyl-6-t-butyl-1,1-dimetylindane, available under the trademark "CELESTOLIDE", 5-acetyl-1,1,2,3.3,6-hexamethylindane, available under the trademark "PHANTOLIDE", 6-acetyl-1-isopropyl-2,3,3,5-tetramethylindane, available under the trademark "TRASEOLIDE", alpha-n-amylcinnamic aldehyde, amyl salicylate, aubepine, aubepine nitrile, aurantion, 2-t-butylcyclohexyl acetate, 2-t-butylcyclohexanol, 3-(p-t-butylphenyl)propanal, 4-t-butylcyclohexyl acetate, 4-1-butyl-3,5-dinitro-2,6-dimethyl acetophenone, 4-t-butylcyclohexanol, benzoin siam resinoids, benzyl benzoate, benzyl acetate, benzyl propionate, benzyl salicylate, benzyl isoamyl ether, benzyl alcohol, bergamot oil, bornyl acetate, butyl salicylate, carvacrol, cedar atlas oil, cedryl methyl ether, cedryl acetate, cinnamic alcohol, cinnamyl propionate, cis-3-hexenol, cis-3-hexenyl salicylate, citronella oil, citronellol, citronellonitrile, citronellyl acetate, citronellyloxyacetaldehyde, cloveleaf oil, coumarin, 9-decen-1-ol, n-decanal, n-dodecanal, decanol, decyl acetate, diethyl phthalate, dihydromyrcenol, dihyromycenyl formate, dihydromyrcenyl acetate, dihydroterpinyl acetate, dimethylbenzyl carbinyl acetate, dimethylbenzylcarbinol, dimethylheptanol, dimethyloctanol, dimyrcetol, diphenyl oxide, ethyl naphthyl ether, ethyl vanillin, ethylene brassylate, eugenol, florocyclene, geraniol, geranium oil, geranonitrile, geranyl nitrile, geranyl acetate, 1,1,2,4,4,7-hexamethyl-6-acetyl-1,2,3,4-tetrahydronaphthalene, available under the trademark "TONALID", 1,3,4,6,7,8-hexahydro-4,6,6,7,8,8-hexamethylcyclopenta-2-benzopyran, available under the trade mark "GALAXOLIDE", 2-n-heptylcydopentanone, 3a,4,5,6,7,7a-hexahydro-4,7-methano-1(3)H-inden-6-ylpropionate, available under the trademark "FLOROCYCLENE", 3a-4,5,6,7,7a-hexahydro-4,7-methano-1(3)H-inden-6-ylacetate, available under the trademark "JASMACYCLENE", 4-(4'-hydroxy-4'-methylpentyl)-3-cyclohexenecarbaldehyde, alpha-hexylcinammic aldehyde, heliotropin, Hercolyn D, hexyl aldone, hexyl cinnamic aldehyde, hexyl salicylate, hydroxycitronellal, i-nonyl formate, 3-isocamphylcyclohexanol, 4-isopropylcyclohexanol, 4-isopropylcyclohexyl methanol, indole, ionones, irones, isoamyl salicylate, isobomeol, isobornyl acetate, isobutyl salicylate, isobutylbenzoate, isobutylphenyl acetate, isoeugenol, isolongifolanone, isomethyl ionones, isononanol, isononyl acetate, isopulegol, lavandin oil, lemongrass oil, linalool, linalyl acetate, LRG 201, 1-menthol, 2-methyl-3-(p-isopropylphenyl)propanal, 2-methyl-3-(p-t-butylphenyl)propanal, 3-methyl-2-pentylcyclopentanone, 3-methyl-5-phenyl-pentanol, alpha and beta methyl naphthyl ketones, methyl ionones, methyl dihydrojasmonate, methyl naphthyl ether, methyl 4-propyl phenyl ether, Mousse de chene Yugo, Musk ambrette, myrtenol, neroli oil, nonanediol-1,3-diacetate, nonanol, nonanolide-1,4, nopol acetate, 1,2,3,4,5,6,7,8-octahydro-2,3,8,8-tetramethyl-2-acetylnaphthalene, available under the trademark "ISO-E-SUPER", octanol, Oppoponax resinoid, orange oil, p-t-amylcyclohexanone, p-t-butylmethylhydrocinnamic aldehyde, 2-phenylethanol, 2-phenylethyl acetate, 2-phenylpropanol, 3-phenylpropanol, para-menthan-7-ol, para-t-butylphenyl methyl ether, patchouli oil, pelargene, petitgrain oil, phenoxyethyl isobutyrate, phenylacetaldehyde diethyl acetal, phenylacetaldehyde dimethyl acetal, phenylethyl n-butyl ether, phenylethyl isoamyl ether, phenylethylphenyl acetate, pimento leaf oil, rose-d-oxide, Sandalone, styrallyl acetate, 1,1,4,4-tetramethyl-6-acetyl-7-ethyl-1,2,3,4-tetrahydronaphthalene, available under the trademark "VERSALIDE", 3,3,5-trimethyl hexyl acetate, 3,5,5-trimethylcyclohexanol, terpineol, terpinyl acetate, tetrahydrogeraniol, tetrahydrolinalool, tetrahydromuguol, tetrahydromyrcenol, thyme oil, trichloromethylphenylcarbinyl acetate, tricyclodecenyl acetate, tricylodecenyl propionate, 10-undecen-1-al, gamma undecalactone, 10-undecen-1-ol, undecanol, vanillin, vetiverol, vetiveryl acetate, vetyvert oil, acetate and propionate esters of alcohol in the list above, aromatic nitromusk fragrances, indane musk fragrances, isochroman musk fragrances, macrocyclic ketones, macrolactone musk fragrances, and tetralin musk fragrances.

The fragrance may be present in known manner in solvents or diluents, such as ethanol, isopropanol, diethylene glycol monoethyl ether, dipropylene glycol, diethyl phthalate and triethyl citrate.

Fragrances which are used in this invention may, if desired, have deodorant properties, for example, as disclosed in U.S. Pat. No. 4,303,679, U.S. Pat. No. 4,663,068 and EP-A-545556.

Encapsulates used in the present invention preferably comprise a hydrated, and more preferably a cross-linked, anionic gum. The anionic gum preferably forms a cross-linked matrix which contains the active ingredient, constituting an encapsulate.

By "anionic gum" is meant water soluble polysaccharides, either exuded or extracted from land and marine plants and their seeds. The exuded or extracted materials result from normal metabolic processes and are usually in the form of salts of acidic polysaccharides. Modified gums are also included which use cellulose as a starting material wherein the hydroxyl groups have been derivatized by a reaction which replaces the hydrogen atoms with a simple or more complex group. Examples of such anionic gums include alginates, carrageenan, gellan gum, carboxyl methyl cellulose and xanthan gum. These gums can be cross-linked with cations, either monovalent or polyvalent cations, to form cross-linked insoluble gels. For example carrageenan may be cross-linked with calcium and potassium ions, and gellan gum may be cross-linked with potassium, sodium, calcium and magnesium ions. Mixtures of two or more of the aformentioned gums may also be employed, which can result in improved encapsulate stability. An alginate anionic gum is preferred.

The preferred alginate is conveniently in the form of a sodium salt, and is preferably an alginate having a high percentage of polyguluronic acid units (known as high G alginates) as these produce encapsulates with improved stability on storage. Suitable alginates are commercially available, and include, for example, the high G alginate "MANUGEL" DMB ("MANUGEL" is a Trade Mark) supplied by NutraSweet Kelco. The aforementioned alginates provide a strong structure, which can for example be incorporated into a detergent composition using standard mixing techniques, and which keep the rigidity of the capsules on storage.

The anionic gum is typically present in an amount of up to about 5% by weight of the encapsulate. Good results have been obtained at lower levels, eg constituting about 1% or less of the weight of the encapsulate. The weight ratio of active material to anionic gum is preferably in the range 5:1 to 300:1, more preferably 10:1 to 100:1, most preferably 20:1 to 60:1. The use of high weight ratios of active to anionic gum gives a cost-effective product with good release of active material, preferably fragrance, on dilution.

The anionic gum and active material, where liquid, form an emulsion, and are preferably formed into an emulsion by use of an emulsifying agent. The emulsifying material is preferably a water soluble polysaccharide, with a molecular weight of greater than 10,000. For example hydroxy cellulosic materials, a polysaccharide derived from the monosaccharide glucose, such as hydroxyethyl cellulose (HEC), hydroxypropyl cellulose (HPC) and hydroxypropylmethyl cellulose, or other polysaccharides containing different sugar monosaccharides where some of the primary alcohol groups of the polysaccharide, have been oxidised to form uronic acid, for example D-glucuronic acid formed by the oxidation of the primary alcohol groups of glucose. Other examples include D-mannuronic acid and D-galacturonic acid. Such polysaccharides and their derivatives include Pectins, gum Tragacanth, alginates, propylene glycol alginate, gum Arabic and gum Ghatti. Combinations of different gums can also be used to achieve superior emulsion stability, such as the combination of propylene glycol alginate and pectins. These materials, particularly propylene glycol alginate, have good emulsifying properties and result in encapsulates with good stability.

Alternatively, the emulsifying material is a water soluble synthetic resin such as polyvinyl alcohol which has excellent film-forming, adhesion and emulsifying properties. Superior emulsion stability can be gained from using a grade of polyvinyl alcohol with a low hydrolysis level and low molecular weight.

The emulsifying agent preferably has a molecular weight (weight average) greater then 10,000, more preferably greater then 25,000, particularly less than 2,000,000, and especially less than 1,000,000.

The emulsifying agent is typically present in an amount in the range from 0.2 to 5%, more preferably 0.3 to 2% and particularly 0.5 to 1% by weight of the encapsulate.

The encapsulates preferably contain little or no materials which would act to solubilise the active material, such as most surfactants with a molecular weight of less than 5000, possibly resulting in leaching of the active material from the encapsulates over time. Some common surfactants such as Tween 20 (polyoxyethylene (20) sorbitan monolaurate ex ICI—Tween 20 is a Trade Mark) may have this effect, and so preferably should be avoided.

The encapsulate conveniently also comprises a colouring material in the form of a pigment or oil soluble colour, eg titanium oxide for white colour, for aesthetic reasons to produce an attractive coloured product instead of a clear or colourless product.

The encapsulate may also contain performance enhancing ingredients which increase the delivery of the active material onto surfaces, for example polymer particles disclosed in WO 98/28398.

The encapsulate preferably comprises in the range from 40 to 90%, more preferably 60 to 80%, and particularly 70 to 75% by weight of solvent, usually water, preferably distilled water.

Encapsulation is a known technique, and methods for producing encapsulates used in the present invention, eg using techniques discussed in the prior art mentioned above, are known to those skilled in the art. The method conveniently involves mixing anionic gum, active material, emulsifying agent and water to produce an aqueous emulsion, eg using high shear mixing, and contacting droplets of the emulsion with an aqueous solution of those monovalent or polyvalent metal ions known to form insoluble gets, such as calcium and zinc, eg by spraying the emulsion into calcium chloride solution. Therefore, by preparing an emulsion of an anionic gum solution and active material and adding this, drop wise, into a calcium chloride solution, spherical encapsulates are formed. Encapsulates of generally spherical form are produced virtually instantaneously by the cross-linking reaction of the gum. The encapsulates can then be washed and stored in a hydrated form prior to use or they can be dried using drying techniques known to those skilled in the art. The capsules can then be dosed into a detergent composition, such as a laundry liquid base, and on diluting the product, the capsules dissolve releasing the active material.

By varying factors including emulsion viscosity, speed of spraying, droplet travel distance, droplet size etc. in known manner, encapsulates of desired size can be produced. For most purposes, encapsulates having a diameter in the range 0.1 to 3 mm, preferably 0.3 to 1 mm, are suitable. Encapsulate properties may also be affected to some extent by the time of contact with the calcium chloride or similar solution.

The encapsulates used in the present invention can also be prepared whereby the active material is surrounded by a wall or barrier of anionic gum. Methods of making these encapsulates are known to those skilled in the art.

Detergent compositions according to the present invention include laundry liquids or fabric detergent products, personal washing products, and household cleaning products.

The laundry liquid comprises an aqueous or non-aqueous liquid phase, containing detergent material, encapsulates as described herein, with or without additional suspended solid material.

Surfactants useful as detergents, such as in laundry liquids, include well-known anionic, nonionic, amphoteric and zwitterionic surfactants. Typical of these are the alkyl benzene sulphonates, alkyl sulphonates, alkyl- and alkyl ether sulphates, primary alkyl sulphates, alkoxylated alcohols, alpha-sulphonates of fatty acids and of fatty acid esters, alkyl betaines, and alkyl polyglycosides all known in the detergent art. The detergent is preferably present in a quantity of at least 5%, more preferably at least 10% by weight of the composition, and may well be in a quantity not exceeding 50%, more preferably not exceeding 40%, and particularly not exceeding 30% by weight of the composition. The laundry liquid preferably contains from 10 to 30% by weight of the composition of detergent material. By the term "% by weight of the composition" is meant relative to the weight of all composition ingredients, including solvent etc.

The laundry liquid preferably contains a builder, which is a material which functions to soften hard water by solubilisation or other removal of polyvalent cations such as calcium and to a lesser extent magnesium salts responsible for water hardness compounds, eg soluble inorganic builders especially exemplified by sodium tripolyphosphate, sodium silicate and carbonates. Thus, builders are added to laundry detergent formulations to counter the detrimental effect of polyvalent cations on detergency, but they are also used to increase the efficiency and effectiveness of surfactants as detergents and to supplement their beneficial effects on soil removal. Soil dispersions are achieved by the builder decreasing the solubility of the surfactant in the bath, which promotes their adsorption onto substrate and soil particles. Builders are also used for alkalinity and buffering as high pH increases the negative potentials at soil substrate and promotes cleaning. Buffering is necessary to prevent soil and substrate components from lowering the pH, which results in lowering the surface potentials. The pH of the laundry liquid is preferably in the range from 7 to 12, more preferably 8 to 11, and particularly about 10.

Common insoluble inorganic detergency builders are zeolites. Organic builders such as sodium citrate and polyacrylate can also be used. The builder component of a laundry liquid is preferably in the range from 5 to 80%, more preferably 10 to 60%, and particularly 10 to 40% by weight.

The laundry liquid preferably contains a water-soluble builder salt, which is partially dissolved and partially suspended in an aqueous liquid phase.

We have surprisingly discovered that encapsulates as described herein are particularly stable when the detergent material comprises anionic surfactant, in the presence of a high concentration of builder. A particularly preferred laundry liquid comprises (i) in the range from 5 to 50%, more preferably 5 to 40%, and particularly 5 to 30% by weight of anionic surfactant as detergent, (ii) in the range from 5 to 80%, more preferably 10 to 60%, and particularly 10 to 40% by weight of builder, and (iii) in the range from 0.2 to 12%, more preferably 0.4 to 4%, and particularly 0.8 to 2% by weight of encapsulate as disclosed herein.

The encapsulates remain intact in the laundry liquid over prolonged storage and retain most of the active material. However, once the product is diluted, the surfactant becomes more soluble and works in combination with the builder to dissolve the encapsulate releasing the active material.

The laundry liquid may also contain other ingredients such as bleaches, bleach activators, alkaline silicate, soil release agents, anti-redeposition agents such as sodium carboxymethyl cellulose, enzymes, fabric softening agents including softening clays, fluorescent brighteners, antifoam agents or conversely foam boosters and fillers such as sodium sulphate.

The laundry liquid preferably contains in the range from 0.1 to 3%, more preferably not greater than 1.5%, and particularly not greater than 1% by weight of fragrance, at least partially carried by encapsulate particles as described herein. The encapsulates preferably comprise at least 5%, more preferably at least 20%, particularly in the range from 40 to 60%, and especially 35 to 50% by weight of the fragrance present in the laundry liquid. The encapsulates are preferably added to the laundry liquid after any manufacturing steps involving heat (e.g. spray drying). Thus, encapsulates may be added to the laundry liquid, typically by mixing them into the preformed liquid detergent composition. The encapsulates may be added as dry particles, or preferably as an aqueous slurry.

The laundry liquid is of generally conventional formulation, eg as disclosed in U.S. Pat. No. 5,281,355. A particularly preferred laundry liquid is a heavy duty, concentrated laundry liquid in which the builder system is typically present in an amount in the range from 10 to 80%, more preferably 25 to 60%, and particularly 30 to 50% by weight of the product.

The builder system in heavy duty laundry liquids is typically made up from a combination of sequestrants, deflocculants, dispersants, and alkaline buffers. This includes ingredients such as phosphates, typically sodium or potassium polyphosphates and especially sodium tripolyphosphate, sodium silicates and carbonates that precipitate polyvalent cations as their insoluble silicates, carbonates, or hydroxides are also used. Other ingredients used as builders are citrates, aluminosilicates, borates, "DEQUEST" (Ethylene diamine tetra methylene phosphoric acid) and EDTA (Ethylene diamine tetra acetic acid).

The encapsulates themselves will introduce polyvalent cations into the wash system on dilution of the product. However, this does not impart any detrimental effect to the cleaning process as the builder system can be adjusted to compensate for this.

Personal washing products include products such as hair shampoos or shower gels. These typically contain from 5 to 40% by weight of the product of detergent material which is anionic, amphoteric, nonionic or a mixture of these, especially a mixture of anionic and/or amphoteric surfactants.

Such personal washing products will frequently include other materials, especially 0.01 to 3% by weight of cationic polymer and/or 0.1 to 10% by weight of silicone to deposit on skin or hair. Preferred personal washing products also comprise electrolyte, such as sodium, potassium, calcium, zinc, and/or magnesium salts, more preferably in the range from 0.1 to 10%, particularly 0.5 to 5%, and especially 1 to 3% by weight, in order to achieve improved stability of the encapsulates. By the term "% by weight" is meant relative to the weight of all ingredients, including solvent etc. The pH of the personal washing products is preferably in the range from 4 to 7, more preferably 5 to 6.

Preferably the personal washing products will be of desirable viscosities, so as to be pourable or squeezable, and yet will not be so thin that they run uncontrollably. The desired viscosity range is approximately 1,000 to 15,000 centipoises at mom temperature (25° C.) and low shear rate, preferably 3,000 to 6,000 centipoises at 10 sec$^{-1}$ shear rate.

Personal washing products preferably contain in the range from 0.5 to 5% by weight of fragrance, at least partially carried by encapsulate particles as described herein. The encapsulates preferably comprise at least 5%, more preferably at least 20%, particularly in the range from 40 to 60%, and especially 35 to 50% by weight of the fragrance present in the personal washing product.

Household cleaning products can be used to clean hard inanimate surfaces such as walls, floors, toilets, and furniture etc. They are preferably aqueous liquids containing detergent material and/or polymeric thickener. Other common ingredients are solvents and bleach. These products typically contain from 5 to 20% detergent and also preferably comprise electrolytes such as sodium, potassium, calcium, zinc and/or magnesium salts, preferably in the range from 0.1 to 10%, particularly 0.5 to 5% and especially 1 to 3% by weight, in order to achieve improved stability of the encapsulate. Product viscosity will frequently exceed 100 centipoise at 10 sec$^{-1}$ shear rate and a range of 200 to 2000 centipoise at 10 sec$^{-1}$ shear rate is preferred. The pH of the household cleaning product is preferably in the range from 4 to 10.

Household cleaning products preferably contain in the range from 0.5 to 3% by weight of fragrance, at least partially carried by encapsulate particles as disclosed herein. The encapsulates preferably comprise at least 5%, more preferably at least 20%, particularly in the range from 40 to 60%, and especially 35 to 50% by weight of the fragrance present in the household cleaning product.

Encapsulate stability can also be improved by the use of a further additive to the capsule formulation to increase the barrier properties of the system, for example by the addition of colloidal silica which can be effective in reducing the leaching of the active material during storage.

The encapsulates will normally be colourless and so not be visually apparent in the product, however if the encapsulates include a colouring material or dye they will be visible in the detergent composition possibly providing a pleasing visual effect that will be readily apparent if the product is presented in a transparent package.

The detergent composition according to the present invention may comprise a suspending agent which prevents sedimentation or floating of the encapsulates. Suitable materials are known, and include xanthan gum and cross-linked polyacrylic acid resins.

Comparative tests have shown that a given amount of fragrance material in a detergent composition according to the present invention produces a stronger fragrance effect, thus providing possibilities for reducing fragrance material usage in product, with consequential cost savings.

The invention is further illustrated by reference to the following Examples.

EXAMPLE 1

Fragrance encapsulates were prepared by mixing using a high shear Silverson mixer the following ingredients (amounts specified in % by weight) to form an emulsion.

|  | Weight % |
|---|---|
| Sodium Alginate ("MANUGEL" DMB) | 0.8 |
| Polyvinyl alcohol ("GOHSENOL" KL05) | 1.0 |
| Distilled water | 72.2 |
| Fragrance A* | 25.0 |

*Containing 0.1% Phthalocyanine Blue 22005 ex Anstead International

"MANUGEL" DMB ex NutraSweet Kelco.
"GOHSENOL" KL05 is a Trade Mark. Polyvinyl alcohol supplied by British Traders.

| Composition of Fragrance A | |
|---|---|
|  | % w/w |
| Dodecanal | 1.25 |
| Methylnonyl acetaldehyde | 2.5 |
| Allyl amyl glycollate | 1.5 |
| Anethole synthetic | 0.2 |
| Benzyl salicylate | 15.0 |
| Carvone laevo | 0.1 |
| "CEDRAMBER" (IFF) | 4.4 |
| Cis-3-hexenyl salicylate | 0.5 |
| Citronellol | 2.5 |
| Coumarin | 1.0 |
| Damascone alpha | 1.0 |
| Dihydro myrcenol | 12.0 |
| Dipropylene glycol | 6.38 |
| Eugenol | 0.8 |
| "TONALID" (Bush Boake Allan) | 9.0 |
| Heliotropin | 0.7 |
| Hexyl cinnamic aldehyde | 12.4 |
| Lavandin Abrialis | 0.7 |
| "LILIAL" (Givaudan-Roure) | 8.0 |
| Linalol | 4.0 |
| Methyl dihydro jasmonate | 7.0 |
| Oakmoss synthetic | 0.3 |
| Para t-butyl cyclo hexyl acetate | 6.0 |
| Patchouli oil | 2.5 |
| Undecalactone gamma | 1.2 |

The emulsion was sprayed as droplets into a reservoir of 5% aqueous calcium chloride, resulting in irreversible cross-linking of the alginate to produce generally spherical encapsulates. The encapsulates were removed from the calcium chloride solution after approximately 60 seconds. The encapsulates were washed in distilled water to remove free chloride ions and suspended in distilled water for storage. The encapsulates had a diameter of about 1 mm in the present case, obtained in known manner by regulating factors including emulsion viscosity, spray pump speed, spray nozzle size and distance from spray nozzle to calcium chloride solution. The encapsulates could be stored in hydrated form for extended periods of time (at least 6 months) without significant loss of fragrance.

The encapsulates were incorporated into a laundry liquid formulation LL1 as specified below, in an amount for the fragrance to constitute 0.4% by weight of the total weight of the laundry liquid, using standard mixing techniques. The laundry liquid base was that of a generally conventional water-based detergent. The encapsulates were incorporated intact in the laundry liquid and remained stable in the base for extended periods (at least 6 months).

Laundry Liquid formulation LL1

|  | Weight % |
| --- | --- |
| "NANSA" SL 30 | 37.70 |
| "TEXAPON" N70 LS | 4.60 |
| "LUVISKOL" K30 | 1.00 |
| Antifoam | 0.1 |
| Sodium Citrate | 15.0 |
| Borax | 0.5 |
| Sodium Silicate | 5.0 |
| Glycerol | 1.0 |
| Purified water | to 100 |
| Preservative | as required |

"NANSA" SL 30 is a 30% active sodium dodecyl benzene sulphonate ex. Albright & Wilson ("NANSA" SL 30 is a Trade Mark).

"TEXAPON" N70 LS is a 70% active sodium lauryl ether sulphate ex. Henkel Chemicals Ltd ("TEXAPON" N70 LS is a Trade Mark).

"LUVISKOL" K 30 is polyvinylpyrrolidone having an average Molecular weight of 40,000 ex. BASF Ltd ("LUVISKOL" K30 is a Trade Mark).

Antifoam Emulsion ex. Dow Corning

Borax ex. Borax Consolidated Ltd.

EXAMPLE 2

Sensory evaluation tests were carried out by a team of evaluators on cloths washed with a laundry liquid containing capsules as detailed in Example 1, compared to the laundry liquid (LL1) containing 0.4% of the fragrance A (not encapsulated). The wash procedure is detailed below.

A shirt, a pillow case and a towel made up the bulk of the cloth used in the wash test, three test cloths were also included which were 30×30 cm desized terry towelling, bulked acrylic and polycotton. The washing machines used were European horizontal drum Miele (Miele is a Trade Mark) machines. 100 ml of each laundry liquid was dosed in to separate machines and set on a quick wash 40 program. The wash programs were started simultaneously. The quick wash 40 program was carried out at 40° C. for 40 minutes.

The test cloths were removed from the machines and evaluated damp and after drying over a 12 hour period. Evaluation of the cloths by the panel indicated that the cloths washed with the encapsulate system were more fragrant and fresher that the cloths wash with an equivalent amount of the neat fragrance in base (not encapsulated).

EXAMPLE 3

Fragrance encapsulates were prepared by making an emulsion of the following ingredients using a Silverson mixer:

|  | Weight % |
| --- | --- |
| Sodium Alginate ("MANUGEL" DMB) | 0.8 |
| Gellan Gum ("KELCOGEL" F) | 0.05 |
| Distilled water | 71.75 |

-continued

|  | Weight % |
| --- | --- |
| Colloidal silica ("LUDOX" HS 40) | 2.0 |
| PGA ("KELCOLOID" S) | 0.4 |
| Fragrance A* | 25.0 |

*Containing 0.1% Phthalocyanine Blue 22005 ex Anstead International

Sodium Alginate ex NutraSweet Kelco

Gellan Gum ("KELCOGEL" F) ex NutraSweet Kelco ("KELCOGEL" is a Trade Mark)

Colloidal silica ("LUDOX" HS 40) ex Du Pont ("LUDOX" HS 40 is a Trade Mark)

PGA: Propylene Glycol Alginate ("KELCOLOID" S ex NutraSweet Kelco) ("KELCOLOID" S is a Trade Mark).

The emulsion was sprayed into a reservoir of aqueous calcium chloride and washed with distilled water as detailed in Example 1. This results in irreversible cross-linking of the alginate to produce generally spherical encapsulates. The gellan gum and colloidal silica both function to give added stability to the encapsulate, in terms of physical integrity and ability to retain fragrance. The encapsulates were then incorporated into the laundry liquid formulation (LL1) in an amount to constitute 0.4% fragrance by weight, using standard mixing techniques. The combination of gums was found to greatly reduce fragrance leaching from the capsule system over 2 months storage at 45°, and still dissolved releasing the fragrance on dilution.

EXAMPLE 4

Jojoba oil encapsulates were prepared by making an emulsion of the following ingredients using a Silverson mixer:

|  | Weight % |
| --- | --- |
| Sodium Alginate (Manugel DMB) | 0.8 |
| Polyvinyl alcohol (Gohsenol KL05) | 1.0 |
| Distilled water | 72.2 |
| JoJoba oil* | 25.0 |

*Containing 0.1% Phthalocyanine Blue 22005 ex Anstead International

Sodium Alginate ex NutraSweet Kelco

Polyvinyl alcohol supplied by British Traders

The emulsion was sprayed into a reservoir of aqueous calcium chloride and washed with distilled water as detailed in Example 1. The encapsulates were then incorporated into a standard laundry liquid detergent (LL1) in an amount to constitute 0.4% oil by weight. The capsules remained stable until dilution of the detergent, with only slight leaching of the oil over storage.

EXAMPLE 5

Dilution release trial were carried out on laundry liquid samples containing the encapsulate system as detailed in Example 1. The test method involved the dilution of 2.5 g of the laundry liquid in a 300 ml glass jar, with 200 g of tap water. The sample was placed on a "LUCKHAM MULTI-MIX" MM1 Rock-roller ("LUCKHAM MULTIMIX" MM1 Rock-roller is a Trade Mark), and complete dissolution of the capsules occurred at all water temperatures between 10 to 50° C.

EXAMPLE 6

Fragrance encapsulates were prepared by making an emulsion of the following ingredients using a Silverson mixer:

|  | Weight % |
|---|---|
| Carboxymethyl cellulose | 2.0 |
| Gellan Gum ("KELCOGEL" F) | 0.05 |
| Distilled water | 70.55 |
| Colloidal silica ("LUDOX" HS 40) | 2.0 |
| PGA ("KELCOLOID" S) | 0.4 |
| Fragrance A* | 25.0 |

*Containing 0.1% Phthalocyanine Blue 22005 ex Anstead International

Carboxymethyl cellulose ("BLANOSE" 12M31P) ex Aqualon ("BLANOSE" 12M31P is a Trade Mark)
Gellan Gum ("KELCOGEL" F) ex NutraSweet Kelco
Colloidal silica ("LUDOX") ex Du Pont
PGA: Propylene Glycol Alginate ("KELCOLOID" S ex NutraSweet Kelco)

The emulsion was sprayed into a reservoir of aqueous aluminium sulphate, causing cross-linking of the carboxymethyl cellulose, and washed with distilled water as detailed in Example 1. The gellan gum and colloidal silica both function to give added stability to the encapsulate, as described in Example 3. The encapsulates were then incorporated into the laundry liquid formulation (LL1) in an amount to constitute 0.4% fragrance by weight, using standard mixing techniques. The capsules dissolved releasing the fragrance on dilution.

EXAMPLE 7

Fragrance encapsulates were prepared by making an emulsion of the following ingredients using a Silverson mixer:

|  | Weight % |
|---|---|
| Kappa Carrageenan | 1.0 |
| Gellan Gum ("KELCOGEL" F) | 0.05 |
| Distilled water | 71.55 |
| Colloidal silica ("LUDOX" HS 40) | 2.0 |
| PGA ("KELCOLOID" S) | 0.4 |
| Fragrance A* | 25.0 |

*Containing 0.1% Phthalocyanine Blue 22005 ex Anstead International

Kappa Carrageenan ex Quest International
Gellan Gum ("KELCOGEL" F) ex NutraSweet Kelco
Colloidal silica ("LUDOX" HS 40) ex Du Pont
PGA: Propylene Glycol Alginate ("KELCOLOID" S ex NutraSweet Kelco)

The emulsion was sprayed into a reservoir of aqueous potassium chloride, causing cross-linking of the kappa carageenan, and washed with distilled water as detailed in Example 1. The gellan gum and colloidal silica both function to give added stability to the encapsulate, as described in Example 3. The encapsulates were then incorporated into the laundry liquid formulation (LL1) in an amount to constitute 0.4% fragrance by weight, using standard mixing techniques. The capsules dissolved releasing the fragrance on dilution.

EXAMPLE 8

Fragrance encapsulates were prepared by making an emulsion of the following ingredients using a Silverson mixer:

|  | Weight % |
|---|---|
| Gellan Gum ("KELCOGEL" F) | 0.05 |
| Distilled water | 73.90 |
| Colloidal silica ("LUDOX" HS 40) | 2.0 |
| PGA ("KELCOLOID" S) | 0.4 |
| Fragrance A* | 25.0 |

*Containing 0.1% Phthalocyanine Blue 22005 ex Anstead International

Gellan Gum ("KELCOGEL" F) ex NutraSweet Kelco
Colloidal silica ("LUDOX" HS 40) ex Du Pont
PGA: Propylene Glycol Alginate ("KELCOLOID" S ex NutraSweet Kelco)

The emulsion was sprayed into a reservoir of aqueous potassium chloride, causing cross-linking of the gellan gum, and washed with distilled water as detailed in Example 1. The colloidal silica functions to give added stability to the encapsulate, in terms of physical integrity and ability to retain fragrance. The encapsulates were then incorporated into the laundry liquid formulation (LL1) in an amount to constitute 0.4% fragrance by weight, using standard mixing techniques. The capsules dissolved releasing the fragrance on dilution.

EXAMPLE 9

Fragrance encapsulates were prepared by making an emulsion of the following ingredients using a Silverson mixer:

|  | Weight % |
|---|---|
| Sodium Alginate ("MANUGEL" DMB) | 0.8 |
| Gellan Gum ("KELCOGEL" F) | 0.1 |
| Distilled water | 83.7 |
| Colloidal silica ("LUDOX" HS 40) | 5.0 |
| PGA ("KELCOLOID" S) | 0.4 |
| Fragrance A* | 10.0 |

*Containing 0.1% Phthalocyanine Blue 22005 ex Anstead International

Sodium Alginate ("MANUGEL" DMB) ex NutraSweet Kelco
Gellan Gum ("KELCOGEL" F) ex NutraSweet Kelco
Colloidal silica ("LUDOX" HS 40) ex Du Pont
PGA: ("KELCOLOID" S) Propylene Glycol Alginate ex NutraSweet Kelco The emulsion was sprayed into a reservoir of aqueous calcium chloride, causing cross-linking of the alginate, and washed with distilled water as detailed in Example 1. The gellan gum and colloidal silica both function to give added stability to the encapsulate, as described in Example 3.

The encapsulates were then incorporated into the hard surface cleaner formulation (HS1) in an amount to constitute 0.3% fragrance by weight, using standard mixing techniques:

| Hard Surface Cleaner Formulation (HS1): | |
|---|---|
| "AKYOGENE" VSM-N (ex. Kao) (anionic-nonionic blend) | 10.0% |
| "DURCAL" 40 (ex. Staffer) (Calcium carbonate) | 40.0% |

| Hard Surface Cleaner Formulation (HS1): | |
| --- | --- |
| Sodium sulphate, 10% solution | 1–3% |
| Purified water | to 100% |
| Preservative | as required |

"AKYOGENE" VSM-N and "DURCAL" 40 are Trade Marks.

In-use trials were carried-out by a team of trained assessors, who detected a clear 'burst' of fragrance when the capsulates ruptured during testing, compared to samples containing the equivalent level of unencapsulated fragrance.

What is claimed is:

1. A liquid detergent composition comprising at least 5% by weight of surfactant and an encapsulate comprising greater than 10% by weight of the encapsulate of active material dispersed in a hydrated cross-linked anionic gum matrix.

2. A detergent composition according to claim 1, wherein the surfactant is present at a concentration in the range from 5 to 50% by weight.

3. A detergent composition according to claim 2, wherein the surfactant is present at a concentration in the range from 10 to 30% by weight.

4. A detergent composition according to claim 1, wherein the surfactant is selected from the group consisting of anionic, nonionic, amphoteric, zwitterionic surfactants and mixtures thereof.

5. A detergent composition according to claim 1, wherein the active material comprises a fragrance.

6. A detergent composition according to claim 1, wherein the active material is present in an amount up to 60% by weight of the encapsulate.

7. A detergent composition according to claim 1, wherein the anionic gum is present in an amount up to 5% by weight of the encapsulate.

8. A detergent composition according to claim 1 wherein the anionic gum is selected from the group consisting of alginate, carageenan, gellan gum, carboxymethyl cellulose and xanthan gum.

9. A detergent composition according to claim 8, wherein the anionic gum is alginate.

10. A liquid detergent composition comprising at least 5% by weight of surfactant and an encapsulate comprising greater than 0.5% by weight of the encapsulate of fragrance, in a hydrated cross-linked anionic gum matrix.

11. A laundry liquid comprising at least 5% by weight of surfactant and an encapsulate comprising active material in a hydrated cross-linked anionic gum matrix.

12. A laundry liquid according to claim 11, wherein the liquid comprises in the range from 5 to 50% by weight of anionic surfactant.

13. A laundry liquid according to claims 11 or 12, wherein the liquid additionally comprises in the range from 5 to 80% by weight of builder.

14. A detergent composition according to claim 6 wherein the active material is present in the range of from 20 to 40% by weight of the encapsulate.

15. A detergent composition according to claim 6, wherein the active material is present in the range of from 25 to 30% by weight of the encapsulate.

16. A detergent composition according to claim 7, wherein the anionic gum is present in an amount up to 1% by weight of the encapsulate.

17. A liquid detergent composition comprising from 10 to 30% by weight of surfactant and an encapsulate comprising from 25 to 30% by weight of the encapsulate of active material dispersed in a hydrated cross-linked anionic gum matrix, the surfactant being selected anionic, nonionic, amphoteric, zwitterionic surfactants and mixtures thereof, the active material comprises a fragrance, the anionic gum is present in an amount of up to 1% by weight of the encapsulate and is selected from the group consisting of alginate, carageenan, gellan gum, carboxymethyl cellulose and xanthan gum.

* * * * *